United States Patent
Shershnyov et al.

(10) Patent No.: US 11,248,792 B2
(45) Date of Patent: Feb. 15, 2022

(54) COMBUSTOR AND GAS TURBINE INCLUDING THE SAME

(71) Applicant: DOOSAN HEAVY INDUSTRIES & CONSTRUCTION CO., LTD., Changwon-si (KR)

(72) Inventors: Borys Shershnyov, Changwon-si (KR); Alexander Myatlev, Gimhae-si (KR)

(*) Notice: Subject to any disclaimer, the term of this patent is extended or adjusted under 35 U.S.C. 154(b) by 0 days.

(21) Appl. No.: 16/887,402

(22) Filed: May 29, 2020

(65) Prior Publication Data
US 2020/0400315 A1 Dec. 24, 2020

(30) Foreign Application Priority Data
Jun. 19, 2019 (KR) .......................... 10-2019-0073078

(51) Int. Cl.
*F23R 3/06* (2006.01)
*F23R 3/10* (2006.01)
(Continued)

(52) U.S. Cl.
CPC ............... *F23R 3/06* (2013.01); *F23R 3/002* (2013.01); *F23R 3/10* (2013.01); *F23R 3/286* (2013.01);
(Continued)

(58) Field of Classification Search
CPC .... F23R 3/04; F23R 3/045; F23R 3/06; F23R 3/10; F23R 3/34; F23R 3/343; F23R 3/346; F01D 9/023
See application file for complete search history.

(56) References Cited

U.S. PATENT DOCUMENTS 8,479,518 B1 * 7/2013 Chen ....................... F23R 3/346
60/733
2002/0189260 A1 * 12/2002 David ..................... F23R 3/045
60/746
(Continued)

FOREIGN PATENT DOCUMENTS

KR 1020010045359 A 6/2001
KR 1020080065553 A 7/2008
(Continued)

OTHER PUBLICATIONS

Korean Notice of Allowance issued by the Korean Intellectual Property Office (KIPO) dated Jul. 10, 2020.

*Primary Examiner* — William H Rodriguez
(74) *Attorney, Agent, or Firm* — Harvest IP Law, LLP

(57) ABSTRACT

A combustor and a gas turbine including the same which can reduce a loss of pressure and enhance a cooling efficiency of a liner and transition piece are provided. The combustor may include a liner configured to define a combustion chamber, a transition piece coupled to a rear end of the liner, a flow sleeve configured to surround the liner and the transition piece, a plurality of impingement holes formed in the flow sleeve, and a plurality of inserts inserted into at least some of the impingement holes, wherein each of the inserts may include a first channel configured to guide combustion air, introduced into an associated one of the impingement holes, in a direction parallel to a direction of extension of an annular passage between the flow sleeve and the liner or an annular passage between the flow sleeve and the transition piece, and a second channel configured to guide the combustion air, introduced into the associated one of the impingement holes, in a direction transverse to the annular passage between the flow sleeve and the liner or the annular passage between the flow sleeve and the transition piece.

20 Claims, 7 Drawing Sheets

(51) Int. Cl.
*F01D 9/02* (2006.01)
*F23R 3/00* (2006.01)
*F23R 3/28* (2006.01)
*F02C 3/04* (2006.01)
*F02C 3/22* (2006.01)
*F02C 7/04* (2006.01)
*F02C 7/22* (2006.01)
*F23R 3/08* (2006.01)

(52) U.S. Cl.
CPC ............... *F01D 9/023* (2013.01); *F02C 3/04* (2013.01); *F02C 3/22* (2013.01); *F02C 7/04* (2013.01); *F02C 7/222* (2013.01); *F23R 3/08* (2013.01); *F23R 2900/03043* (2013.01); *F23R 2900/03044* (2013.01)

(56) References Cited

U.S. PATENT DOCUMENTS

| | | | | |
|---|---|---|---|---|
| 2003/0046934 | A1* | 3/2003 | Sherwood | F23R 3/04 60/722 |
| 2004/0083737 | A1* | 5/2004 | Wright | F23R 3/286 60/773 |
| 2004/0216463 | A1* | 11/2004 | Harris | F23R 3/12 60/776 |
| 2004/0231336 | A1* | 11/2004 | Westlake | F23R 3/045 60/748 |
| 2008/0134682 | A1* | 6/2008 | Garry | F23R 3/06 60/752 |
| 2011/0289928 | A1* | 12/2011 | Fox | F23R 3/286 60/740 |
| 2012/0017596 | A1* | 1/2012 | Rudrapatna | F23R 3/06 60/752 |
| 2013/0031783 | A1* | 2/2013 | DiCintio | F23R 3/283 29/890.02 |
| 2013/0167547 | A1* | 7/2013 | Stoia | F23R 3/045 60/772 |
| 2013/0239575 | A1* | 9/2013 | Chen | F23R 3/04 60/747 |
| 2013/0283801 | A1* | 10/2013 | Romig | F23R 3/36 60/733 |
| 2013/0283807 | A1* | 10/2013 | Stoia | F23R 3/34 60/772 |
| 2013/0298560 | A1* | 11/2013 | Melton | F23R 3/346 60/733 |
| 2014/0174090 | A1* | 6/2014 | Chen | F23R 3/346 60/740 |
| 2014/0190170 | A1* | 7/2014 | Cai | F23R 3/286 60/746 |
| 2015/0285501 | A1* | 10/2015 | DiCintio | F23R 3/283 60/740 |
| 2015/0285504 | A1* | 10/2015 | Melton | B23K 26/702 60/737 |
| 2015/0362190 | A1* | 12/2015 | Taylor | F23R 3/002 60/752 |
| 2016/0131363 | A1* | 5/2016 | Cunha | F23R 3/045 60/755 |
| 2016/0377289 | A1* | 12/2016 | Kostka, Jr. | F23R 3/04 60/752 |
| 2017/0284675 | A1* | 10/2017 | North | F23R 3/425 |
| 2018/0039254 | A1* | 2/2018 | North | B33Y 10/00 |
| 2018/0328587 | A1* | 11/2018 | Gubba | F23R 3/10 |
| 2019/0128138 | A1* | 5/2019 | Krewinkel | F01D 9/065 |
| 2019/0178496 | A1* | 6/2019 | Jones | F23R 3/002 |
| 2019/0178498 | A1* | 6/2019 | Wilson | F23R 3/346 |
| 2019/0226680 | A1* | 7/2019 | North | F23R 3/34 |
| 2019/0309952 | A1* | 10/2019 | Miduturi | F23R 3/346 |
| 2020/0041127 | A1* | 2/2020 | Vukanti | F23R 3/06 |

FOREIGN PATENT DOCUMENTS

| | | |
|---|---|---|
| KR | 1020160092939 A | 8/2016 |
| KR | 101770068 B1 | 8/2017 |
| KR | 1020190021013 A | 3/2019 |

* cited by examiner

[Fig.1]
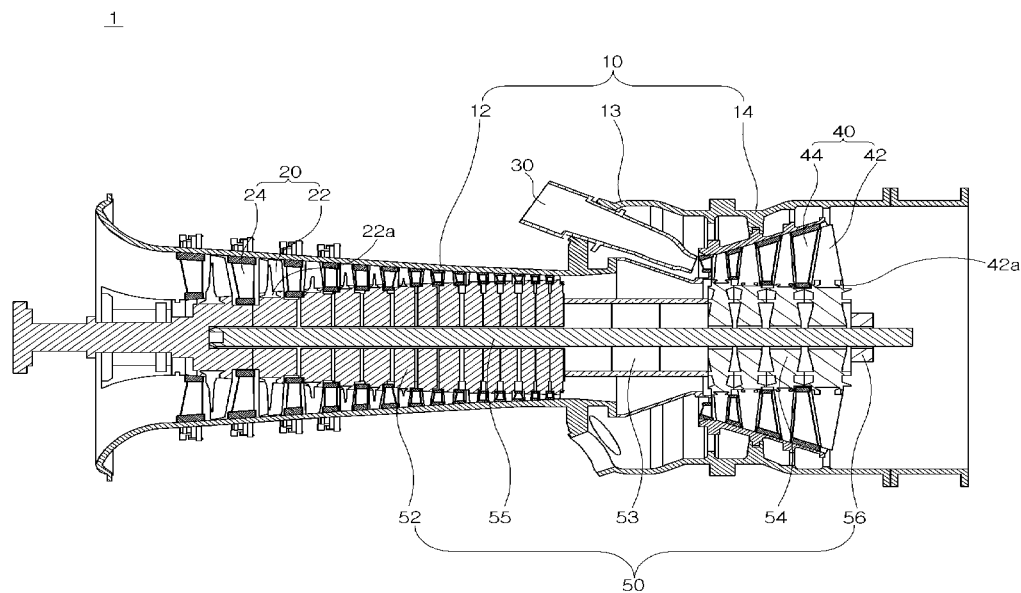
[Fig.2]
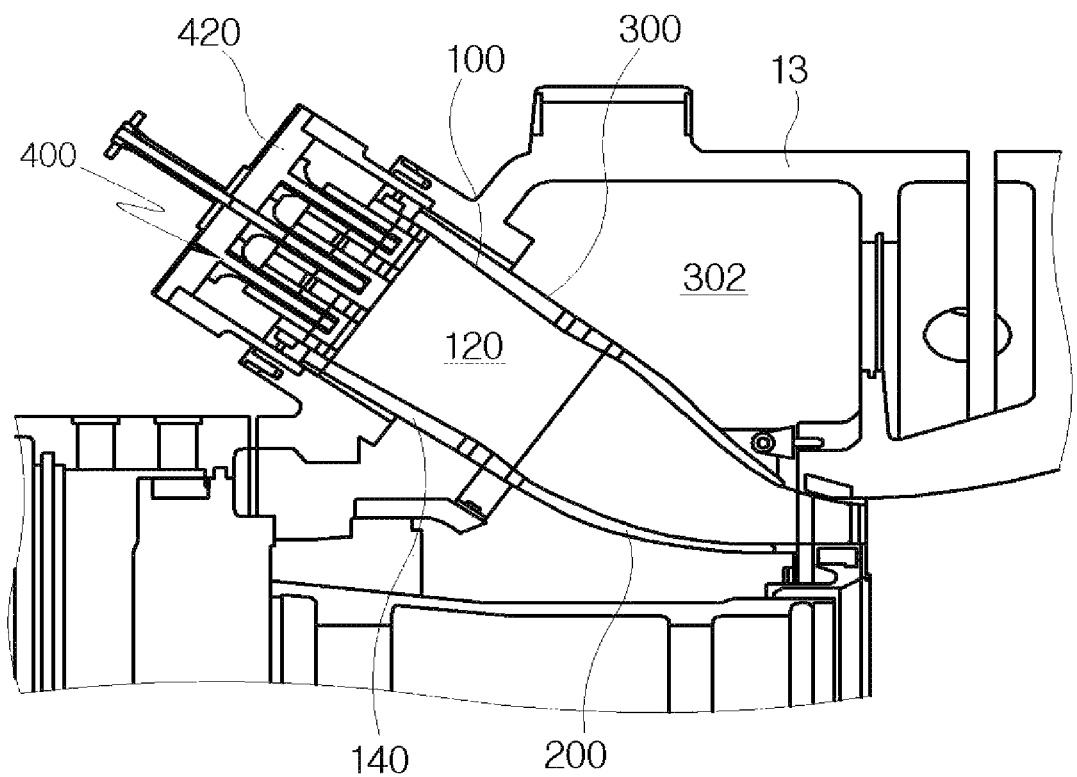

[Fig.3]
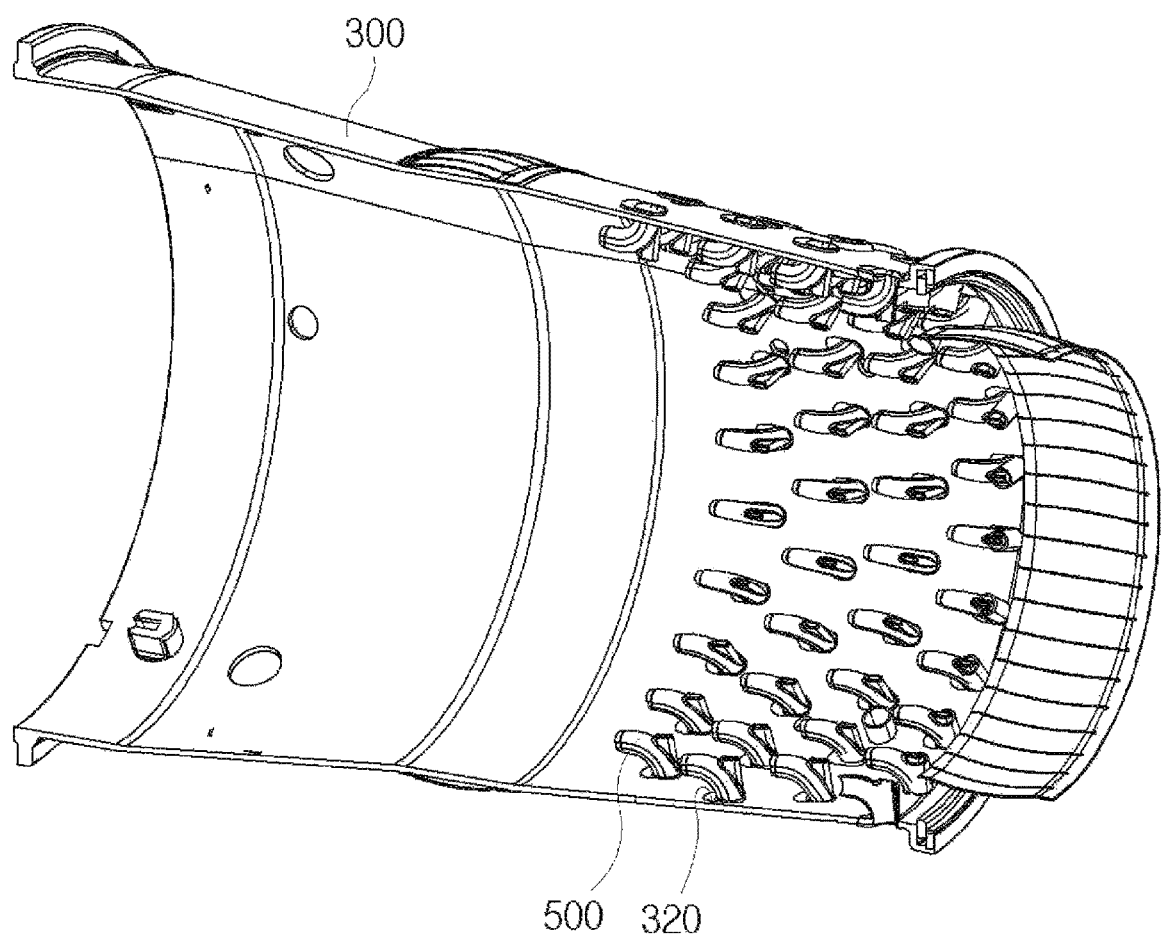

[Fig.4]
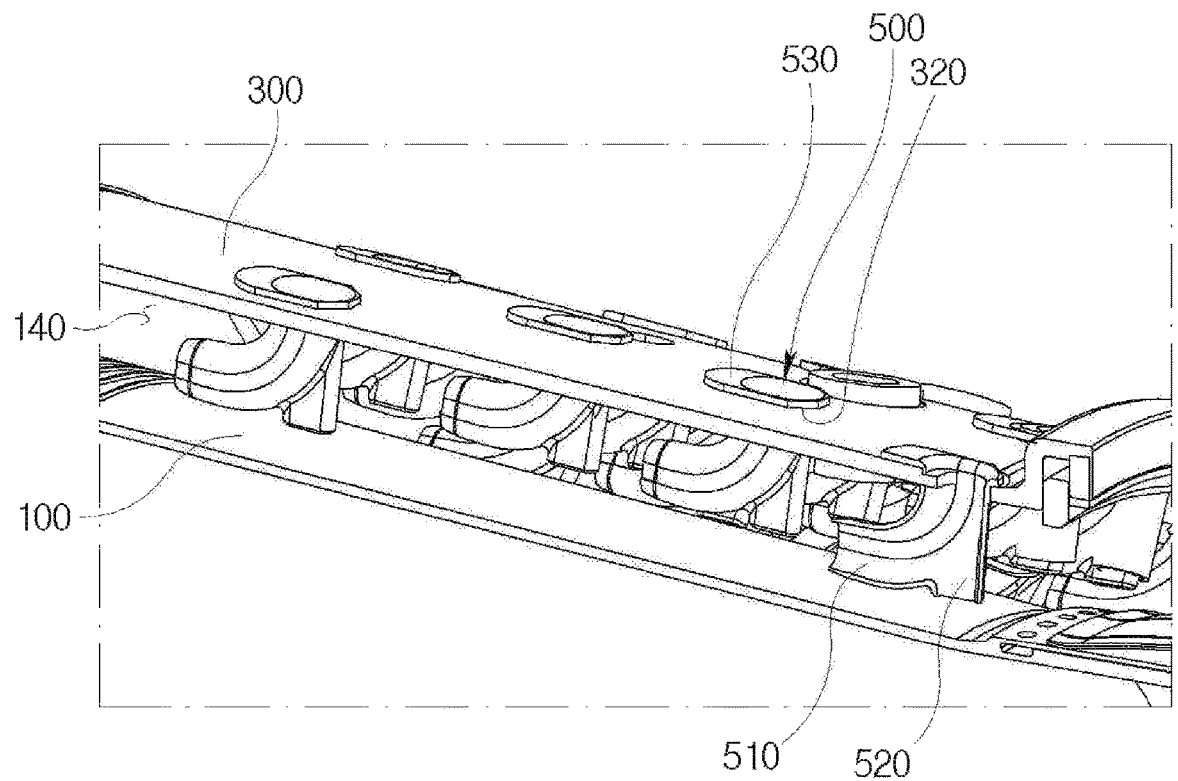

[FIG. 5]
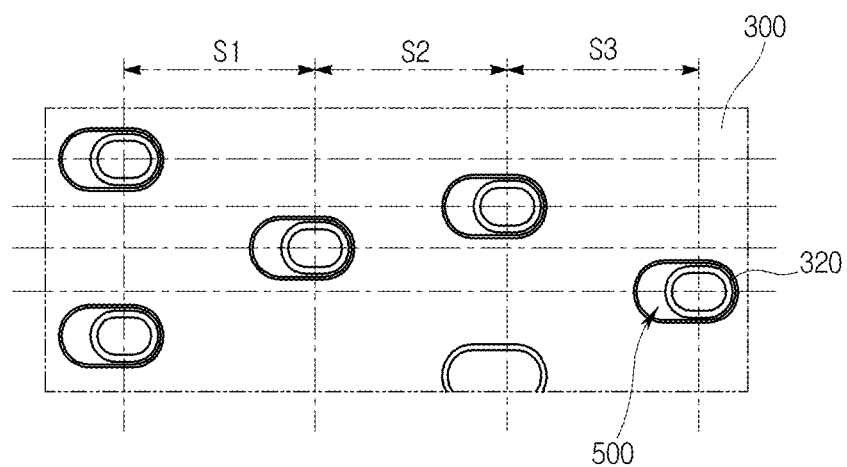

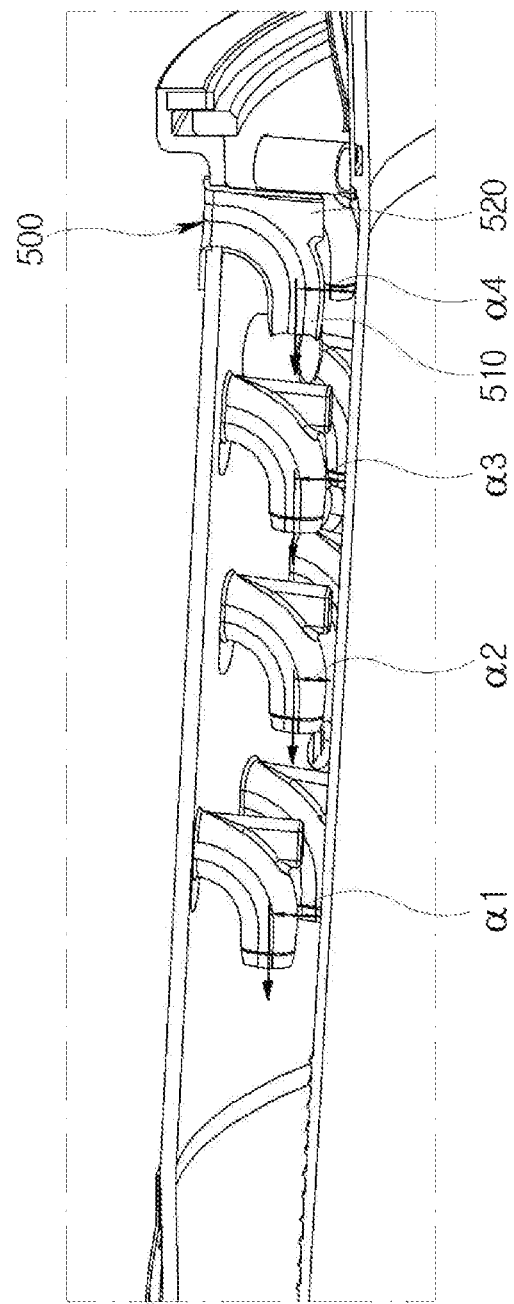
[Fig. 6]

[FIG. 7]
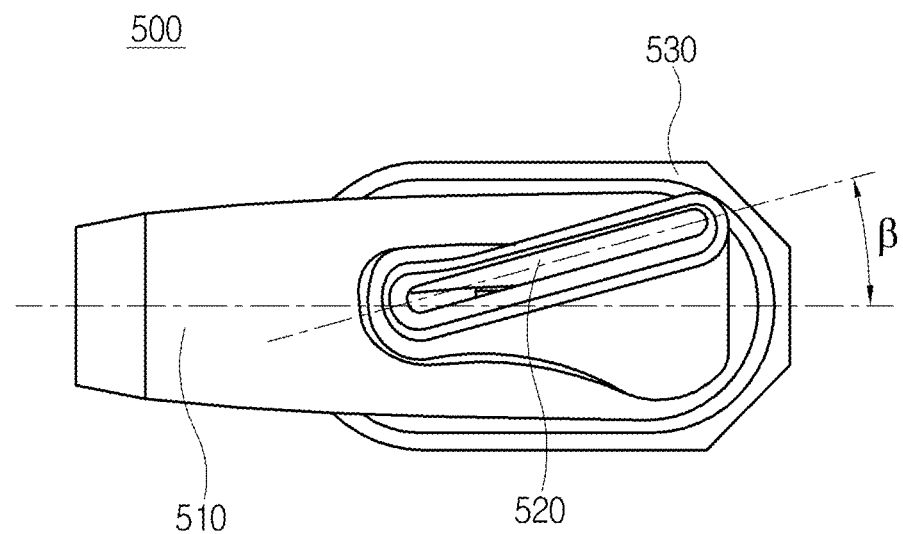
[FIG. 8]
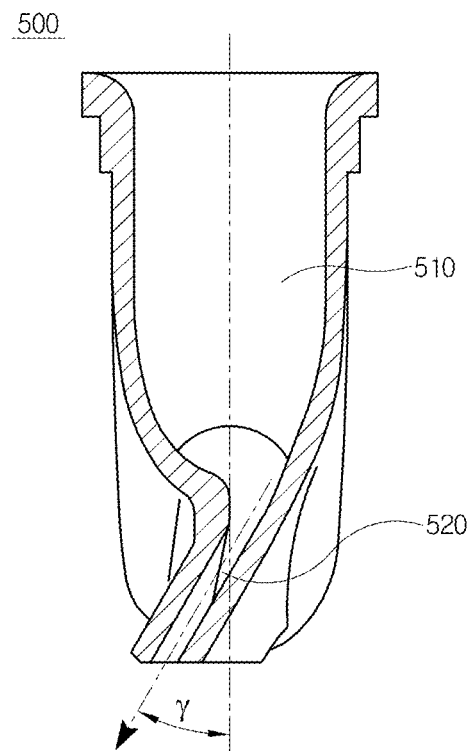

[FIG. 9]
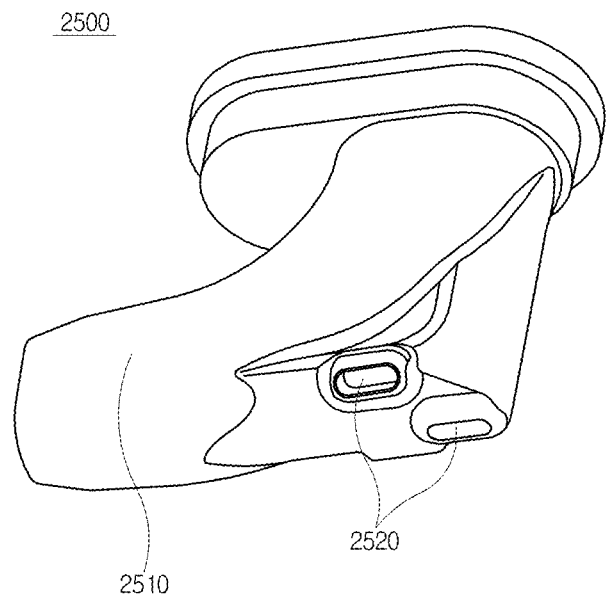
[FIG. 10]
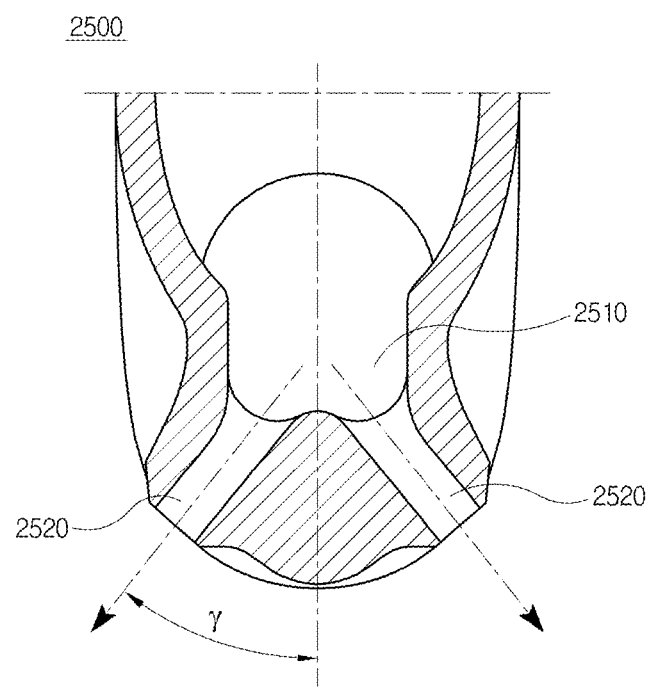

COMBUSTOR AND GAS TURBINE INCLUDING THE SAME

CROSS-REFERENCE TO RELATED APPLICATION

This application claims priority to Korean Patent Application No. 10-2019-0073078, filed on Jun. 19, 2019, the disclosure of which is incorporated herein by reference in its entirety.

BACKGROUND

Technical Field

Apparatuses and methods consistent with exemplary embodiments relate to a combustor and a gas turbine including the same, and more particularly, to a combustor capable of reducing a loss of pressure while enhancing a cooling efficiency of a liner and transition piece by including first and second channels to guide air for cooling the liner or the transition piece, and a gas turbine including the same.

Description of the Related Art

Turbines are machines that convert an energy of a fluid, such as water, gas, or steam, into mechanical work, and are referred to as turbo machines in which a large number of buckets or blades are mounted to a circumference of each rotor and steam or gas is emitted thereto to rotate the rotor at high speed by impingement or reaction force.

Examples of the turbines include a water turbine using the energy of high-positioned water, a steam turbine using the energy of steam, an air turbine using the energy of high-pressure compressed air, a gas turbine using the energy of high-temperature and high-pressure gas, and the like.

The gas turbine is an internal combustion engine that converts thermal energy into a rotational force as mechanical energy in such a way to rotate a turbine by injecting, into the turbine, high-temperature and high-pressure combustion gas that is produced by mixing fuel with air compressed to high pressure in a compressor and by burning a mixture thereof.

The gas turbine is advantageous in that consumption of lubricant is extremely low due to an absence of mutual friction parts such as a piston-cylinder because the gas turbine does not have a reciprocating mechanism such as a piston which is usually provided in a four-stroke engine, and an amplitude of vibration is markedly reduced unlike reciprocating machines having high-amplitude characteristics. Therefore, high-speed motion is possible.

The gas turbine may include a compressor that compresses air, a combustor that burns a mixture of fuel and the compressed air supplied from the compressor to produce combustion gas, and a turbine that generates electric power by rotating turbine blades with the high-temperature and high-pressure gas supplied from the combustor.

The combustor may mix fuel with compressed air supplied from the compressor, combust the mixture to generate high-temperature and high-pressure combustion gas having high energy, and increase through an isobaric combustion process the temperature of the combustion gas to a heat resistant limit temperature at which the combustor and the turbine can endure.

The combustor of the gas turbine may include a liner and a transition piece. The mixture of fuel and compressed air is burned to produce hot combustion gas in the liner, and the hot combustion gas flows from the liner through the transition piece into the turbine. In order to prevent the liner and the transition piece from being damaged due to the high temperature of the combustion gas, outer walls of the liner and transition piece should be cooled by the compressed air supplied from the compressor.

To this end, the liner and the transition piece are surrounded by a flow sleeve so that the compressed air is introduced through cooling holes formed in the flow sleeve to impinge on the outer walls of the liner and transition piece, thereby enabling the liner and the transition piece to be cooled. The compressed air used to cool the liner and the transition piece flows to a front of the liner along a space between the liner and transition piece and the flow sleeve.

In this case, the compressed air introduced into the flow sleeve through the cooling holes is directed radially inward therefrom, and the compressed air flowing to the front of the liner along the space between the liner and transition piece and the flow sleeve is directed in an axial direction of the flow sleeve. Therefore, a loss of pressure may occur due to an interaction caused if the two types of compressed air flowing in different directions meet each other.

SUMMARY

Aspects of one or more exemplary embodiments provide a combustor capable of reducing a loss of pressure while enhancing a cooling efficiency of a liner and transition piece as each insert includes first and second channels to guide air for cooling the liner or the transition piece, and a gas turbine including the same.

Additional aspects will be set forth in part in the description which follows and, in part, will become apparent from the description, or may be learned by practice of the exemplary embodiments.

According to an aspect of an exemplary embodiment, there is provided a combustor including: a liner configured to define a combustion chamber, a transition piece coupled to a rear end of the liner, a flow sleeve configured to surround the liner and the transition piece, a plurality of impingement holes formed in the flow sleeve, and a plurality of inserts inserted into at least some of the impingement holes, wherein each of the inserts may include a first channel configured to guide combustion air, introduced into an associated one of the impingement holes, in a direction parallel to a direction of extension of an annular passage between the flow sleeve and the liner or an annular passage between the flow sleeve and the transition piece, and a second channel configured to guide the combustion air, introduced into the associated one of the impingement holes, in a direction transverse to the annular passage between the flow sleeve and the liner or the annular passage between the flow sleeve and the transition piece.

The first channel may be formed in front of the second channel in a direction of flow of combustion air in the annular passage.

The insert may have a low air resistance coefficient.

The inserts may be arranged in a plurality of rows in an axial direction of the flow sleeve, and the inserts in adjacent rows may be staggered.

At least some of distances between the adjacent rows may be different from each other.

The second channel may be branched from the first channel to extend toward a surface of the liner or transition piece.

The second channel may include two or more second channels.

The two or more second channels may be formed symmetrically with respect to a plane of symmetry of the first channel.

An angle (α) of a direction of discharge of combustion air from each of the first channels with respect to a surface of the liner or transition piece may be in a range of −10 to 30 degrees.

In the inserts in adjacent rows, angles (α) of directions of discharge of individual types of combustion air from the respective first channels with respect to the surface of the liner or transition piece may be different from each other.

An angle (β) of the horizontal direction of discharge of combustion air from each of the second channels with respect to a plane of symmetry of an associated first channel may be in a range of −30 to 30 degrees.

An angle (γ) of the vertical direction of discharge of combustion air from each of the second channels with respect to a plane of symmetry of an associated first channel may be in a range of −30 to 30 degrees.

According to an aspect of another exemplary embodiment, there is provided a gas turbine including: a compressor configured to compress air, a combustor configured to mix fuel with the air compressed by the compressor and combust a mixture of fuel with the compressed air to produce high-temperature and high-pressure combustion gas, and a turbine configured to generate power using the combustion gas produced by the combustor. The combustor may include a liner configured to define a combustion chamber, a transition piece coupled to a rear end of the liner, a flow sleeve configured to surround the liner and the transition piece, a plurality of impingement holes formed in the flow sleeve, and a plurality of inserts inserted into at least some of the impingement holes, wherein each of the inserts may include a first channel configured to guide combustion air, introduced into an associated one of the impingement holes, in a direction parallel to a direction of extension of an annular passage between the flow sleeve and the liner or an annular passage between the flow sleeve and the transition piece, and a second channel configured to guide the combustion air, introduced into the associated one of the impingement holes, in a direction transverse to the annular passage between the flow sleeve and the liner or the annular passage between the flow sleeve and the transition piece.

The first channel may be formed in front of the second channel in a direction of flow of compressed air in the annular passage.

The inserts may be arranged in a plurality of rows in an axial direction of the flow sleeve, and the inserts in adjacent rows may be staggered.

The second channel may be branched from the first channel to extend toward a surface of the liner or transition piece.

The second channel may include two or more second channels, and the two or more second channels may be formed symmetrically with respect to a plane of symmetry of the first channel.

An angle (α) of a direction of discharge of compressed air from each of the first channels with respect to a surface of the liner or transition piece may be in a range of −10 to 30 degrees.

An angle (β) of a horizontal direction of discharge of compressed air from each of the second channels with respect to a plane of symmetry of the associated first channel may be in a range of −30 to 30 degrees.

An angle (γ) of a vertical direction of discharge of compressed air from each of the second channels with respect to a plane of symmetry of the associated first channel may be in a range of −30 to 30 degrees.

BRIEF DESCRIPTION OF THE DRAWINGS

The above and other aspects will become more apparent from the following description of the exemplary embodiments with reference to the accompanying drawings, in which:

FIG. 1 is a view illustrating a gas turbine according to an exemplary embodiment;

FIG. 2 is a view illustrating a combustor in the gas turbine according to an exemplary embodiment;

FIG. 3 is a view illustrating a state in which inserts are mounted on a flow sleeve according to an exemplary embodiment;

FIG. 4 is an enlarged view illustrating the state in which the inserts are mounted on the flow sleeve according to the exemplary embodiment;

FIG. 5 is a view illustrating the flow sleeve, on which the inserts are mounted, when viewed from an outside according to the exemplary embodiment;

FIG. 6 is a front view of FIG. 4;

FIG. 7 is a bottom view illustrating one insert according to the exemplary embodiment;

FIG. 8 is a side view illustrating one insert according to the exemplary embodiment;

FIG. 9 is a bottom perspective view illustrating one insert according to another exemplary embodiment; and FIG. 10 is a side cross-sectional view illustrating one insert according to the another exemplary embodiment.

DETAILED DESCRIPTION

Various modifications may be made to the embodiments of the disclosure, and there may be various types of embodiments. Thus, specific embodiments will be illustrated in the accompanying drawings and the embodiments will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

The terminology used herein is for the purpose of describing particular embodiments only and is not intended to limit the scope of the disclosure. As used herein, the singular forms "a", "an", and "the" are intended to include the plural forms as well, unless the context clearly indicates otherwise. In this specification, terms such as "comprise", "include", or "have/has" should be construed as designating that there are such features, integers, steps, operations, elements, components, and/or a combination thereof in the specification, not to exclude the presence or possibility of adding one or more of other features, integers, steps, operations, elements, components, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Hereinafter, a combustor and a gas turbine including the same according to exemplary embodiments will be described with reference to the accompanying drawings. In order to clearly illustrate the disclosure in the drawings, some of the elements that are not essential to the complete understanding of the disclosure may be omitted, and like reference numerals refer to like elements throughout the specification.

FIG. 1 is a view illustrating a gas turbine according to an exemplary embodiment, and FIG. 2 is a view illustrating a combustor in the gas turbine according to an exemplary embodiment.

Referring to FIG. 1, the gas turbine 1 according to the exemplary embodiment may include a casing 10, a compressor 20 that draws and compresses air to a high pressure, a combustor 30 that mixes fuel with the air compressed by the compressor 20 and combusts a mixture of fuel with the compressed air, and a turbine 40 that generates a rotational force using the combustion gas transmitted from the combustor 30 to generate electric power.

The casing 10 may include a compressor casing 12 for accommodating the compressor 20 therein, a combustor casing 13 for accommodating the combustor 30 therein, and a turbine casing 14 for accommodating the turbine 40 therein. Here, the compressor casing 12, the combustor casing 13, and the turbine casing 14 may be arranged sequentially from an upstream to a downstream in a direction of fluid flow.

A rotor (i.e., a center shaft) 50 may be rotatably provided in the casing 10, a generator (not illustrated) may be connected to the rotor 50 to generate power, and a diffuser may be provided downstream in the casing 10 to discharge the combustion gas passing through the turbine 40.

The rotor 50 may include a compressor rotor disk 52 that is accommodated in the compressor casing 12, a turbine rotor disk 54 that is accommodated in the turbine casing 14, a torque tube 53 that is accommodated in the combustor casing 13 to connect the compressor rotor disk 52 to the turbine rotor disk 54, and a tie rod 55 and a fixing nut 56 that fasten the compressor rotor disk 52, the torque tube 53, and the turbine rotor disk 54 to each other.

The compressor rotor disk 52 may include a plurality of compressor rotor disks arranged in an axial direction of the rotor 50. That is, the compressor rotor disks 52 may be formed in a multistage manner. In addition, each of the compressor rotor disks 52 may have a substantially disk shape and include a compressor blade coupling slot formed in an outer peripheral portion thereof such that a compressor blade 22 is coupled to the compressor blade coupling slot.

The turbine rotor disk 54 has a structure similar to the compressor rotor disk 52. That is, the turbine rotor disk 54 may include a plurality of turbine rotor disks arranged in the axial direction of the rotor 50. The turbine rotor disks 54 may be formed in a multistage manner. In addition, each of the turbine rotor disks 54 may have a substantially disk shape and include a turbine blade coupling slot formed in the outer peripheral portion thereof such that a turbine blade 42 is coupled to the turbine blade coupling slot.

The torque tube 53 is a torque transmission member that transmits the rotational force of the turbine rotor disk 54 to the compressor rotor disk 52. One end of the torque tube 53 may be fixed to a most-downstream-side compressor rotor disk in the direction of air flow, from among the compressor rotor disks 52, and the other end of the torque tube 53 may be fixed to a most-upstream-side turbine rotor disk in the direction of combustion gas flow, from among the turbine rotor disks 54. Here, the torque tube 53 may include a protrusion formed at each of one end and the other end thereof, and each of the compressor rotor disk 52 and the turbine rotor disk 54 may include a groove engaged with the protrusion. Thus, it is possible to prevent the torque tube 53 from rotating relative to the compressor rotor disk 52 and the turbine rotor disk 54.

The torque tube 53 may have a hollow cylindrical shape such that the air supplied from the compressor 20 flows to the turbine 40 through the torque tube 53. The torque tube 53 may be formed to resist deformation and distortion due to the characteristics of the gas turbine that continues to operate for a long time, and may be easily assembled and disassembled for easy maintenance.

The tie rod 55 may pass through the plurality of compressor rotor disks 52, the torque tube 53, and the plurality of turbine rotor disks 54. One end of the tie rod 55 may be fastened to a most-upstream-side compressor rotor disk in the direction of air flow, from among the compressor rotor disks 52, and the other end of the tie rod 55 may protrude in a direction opposite to the compressor 20 with respect to a most-downstream-side turbine rotor disk in the direction of combustion gas flow, from among the turbine rotor disks 54, so as to be fastened to the fixing nut 56.

Here, the fixing nut 56 presses the most-downstream-side turbine rotor disk 54 toward the compressor 20 to reduce the distance between the most-upstream-side compressor rotor disk 52 and the most-downstream-side turbine rotor disk 54, with the consequence that the plurality of compressor rotor disks 52, the torque tube 53, and the plurality of turbine rotor disks 54 may be compressed in the axial direction of the rotor 50. Therefore, it is possible to prevent the axial movement and relative rotation of the plurality of compressor rotor disks 52, the torque tube 53, and the plurality of turbine rotor disks 54.

It is understood that the type of the tie rod 55 may not be limited to the example illustrated in FIG. 1, and may be changed or vary according to one or more other exemplary embodiments. For example, there are three types of tie rods: a single-type in which a single tie rod extends through the center of the compressor rotor disks; a multi-type in which multiple tie rods are arranged in a circumferential direction; and a complex type in which the single-type and the multi-type are combined.

Through the configuration described above, the rotor 50 may be rotatably supported at both ends thereof by bearings and one end of the rotor 50 may be connected to the drive shaft of the generator.

The compressor 20 may include a compressor blade 22 that rotates together with the rotor 50, and a compressor vane 24 that is installed in the compressor casing 12 to align the flow of the air introduced into the compressor blade 22.

The compressor blade 22 may include a plurality of compressor blades arranged in a multistage manner in the axial direction of the rotor 50, and the plurality of compressor blades 22 may be formed radially in the direction of rotation of the rotor 50 for each stage.

Each of the compressor blades 22 may include a root 22a that is coupled to the compressor blade coupling slot of the compressor rotor disk 52. The root 22a may have a fir-tree shape to prevent the compressor blade 22 from being decoupled from the compressor blade coupling slot in the radial direction of the rotor 50. In this case, the compressor blade coupling slot may also have a fir-tree shape so as to correspond to the root 22a of the compressor blade 22.

Although the compressor blade root 22a and the compressor blade coupling slot are illustrated as having the fir-tree shape in FIG. 1, it is not limited thereto. For example, they may have a dovetail shape. Alternatively, the compressor blade 22 may be coupled to the compressor rotor disk 52 using other types of coupling members, such as a key or a bolt.

For example, the compressor rotor disk 52 and the compressor blade 22 may be coupled to each other in a tangential type or an axial type. Here, the compressor blade root 22a is inserted into the compressor blade coupling slot in the axial direction of the rotor 50 in the axial type as described above. Thus, the compressor blade coupling slot may include a plurality of compressor blade coupling slots arranged radially in the circumferential direction of the compressor rotor disk 52.

The compressor vane 24 may include a plurality of compressor vanes arranged in a multistage manner in the axial direction of the rotor 50. Here, the compressor vanes 24 and the compressor blades 22 may be arranged alternately in the direction of air flow. In addition, the plurality of compressor vanes 24 may be formed radially in the direction of rotation of the rotor 50 for each stage.

The combustor 30 mixes fuel with the air introduced from the compressor 20, burns the fuel-air mixture to produce high-temperature and high-pressure combustion gas with high energy, and increases the temperature of the combustion gas to a temperature at which the combustor and the turbine are able to be resistant to heat through an isobaric combustion process.

A plurality of combustors constituting the combustor 30 are arranged in the direction of rotation of the rotor 50 in the combustor casing.

Referring to FIG. 2, each of the combustors 30 includes a liner 100 into which the air compressed by the compressor 20 is introduced, and a transition piece 200 that is positioned behind the liner 100 to guide the combustion gas to the turbine 40. The liner 100 defines a combustion chamber 120 therein, and a flow sleeve 300 is disposed to annularly surround the liner 100 and the transition piece 200.

The combustor 30 includes a plurality of combustor nozzle assemblies 400 configured to mix fuel with the compressed air supplied from the compressor 20. The nozzle assemblies 400 are coupled to a front of the liner 100. An end plate 420 is coupled to the combustor casing 13 or in front of the flow sleeve 300 to support the nozzle assemblies 400, thereby enabling the combustor 30 to be sealed.

It is important to cool the liner 100 and the transition piece 200 exposed to high-temperature and high-pressure combustion gas in order to increase the durability of the combustor 30. To this end, the compressed air (i.e., combustion air) supplied from the compressor 20 may be introduced from an accommodation space 302, which is defined by the combustor casing 13 to accommodate the compressed air, through a plurality of impingement holes 320 formed in the flow sleeve 300, into an annular passage 140 between the liner 100 and transition piece 200 and the flow sleeve 300.

The compressed air introduced into the annular passage 140 between the liner 100 and transition piece 200 and the flow sleeve 300 flows to the front of the combustor 30 while cooling the outer walls of the liner 100 and transition piece 200. The compressed air reaches the end plate 420 and switches in an opposite direction to be supplied to the nozzle assemblies 400. That is, the compressed air flowing out of the compressor 20 is injected into the combustion chamber 120 while mixing with fuel through the nozzle assemblies 400, so that the mixture of fuel and air is ignited and burned by an ignition plug (not illustrated) in the combustion chamber 120. The combustion gas is discharged through the transition piece 200 to the turbine 40, thereby generating a rotational force.

In this case, a plurality of inserts 500 may be inserted into at least some of the impingement holes 320 to guide the compressed air introduced into the impingement holes. Each inserts 500 is characterized by guiding compressed air in a direction substantially parallel to a direction of extension of the annular passage 140, and at the same time, by guiding compressed air in a direction transverse to the annular passage 140 toward the outer wall of the liner 100 or the transition piece 200.

The turbine 40 has a structure similar to the compressor 20. The turbine 40 may include a turbine blade 42 that rotates together with the rotor 50, and a turbine vane 44 that is fixedly installed in the turbine casing 14 to align the flow of the air introduced into the turbine blade 42.

The turbine blade 42 may include a plurality of turbine blades arranged in a multistage manner in the axial direction of the rotor 50, and the plurality of turbine blades 42 may be formed radially in the direction of rotation of the rotor 50 for each stage.

Each of the turbine blades 42 may have a root 42a that is coupled to the turbine blade coupling slot of the turbine rotor disk 54. The root 42a may have a fir-tree shape to prevent the turbine blade 42 from being decoupled from the turbine blade coupling slot in the radial direction of the rotor 50. In this case, the turbine blade coupling slot may also have a fir-tree shape so as to correspond to the root 42a of the turbine blade.

The turbine vane 44 may include a plurality of turbine vanes arranged in a multistage manner in the axial direction of the rotor 50. Here, the turbine vanes 44 and the turbine blades 42 may be arranged alternately in the direction of air flow. In addition, the plurality of turbine vanes 44 may be formed radially in the direction of rotation of the rotor 50 for each stage.

Because the turbine 40 comes into direct contact with high-temperature and high-pressure combustion gas unlike the compressor 20, the turbine 40 requires a cooling device to prevent damage such as deterioration. To this end, the gas turbine may include a cooling passage through which some of the compressed air is drawn out from some portions of the compressor 20 to be supplied to the turbine 40.

The cooling passage may extend outside the casing 100 (i.e., an external passage), or extend through the inside the rotor 50 (i.e., an internal passage), or both of the external passage and the internal passage may be used as the cooling passage.

In this case, the cooling passage may communicate with a turbine blade cooling passage in the turbine blade 42 to cool the turbine blade 42 with cooling air. The turbine blade cooling passage may communicate with a turbine blade film cooling hole formed in a surface of the turbine blade 42 so that the cooling air is supplied to the surface of the turbine blade 42, thereby enabling the turbine blade 42 to be cooled by the cooling air in a film cooling manner. The turbine vane 44 may also be cooled by the cooling air supplied from the cooling passage.

It is understood that the gas turbine is given merely by way of an example, and the combustor of the exemplary embodiments may be widely applied to a jet engine in which air and fuel are burned.

Hereinafter, a plurality of inserts 500 according to an exemplary embodiment will be described with reference to FIGS. 3 to 8.

Referring to FIGS. 3 to 5, a plurality of inserts 500 are respectively inserted into a plurality of impingement holes 320 formed in the flow sleeve 300 disposed to surround the liner 100.

The plurality of inserts 500 are arranged in a plurality of rows in the axial direction of the flow sleeve 300. It is understood that although the inserts 500 are arranged in four rows in FIG. 3, it is not limited thereto. In FIG. 3, in order to minimize an interaction between individual types of compressed air discharged from adjacent inserts 500, the inserts 500 in adjacent rows may be staggered with each other. However, as illustrated in FIG. 5, the inserts 500 in adjacent rows may be staggered so as not to be on the same line. Accordingly, it is possible to minimize an interaction between the compressed air that is discharged from each insert 500, especially the compressed air, which is guided in a direction substantially parallel to the direction of extension of the annular passage 140, and an adjacent insert 500 positioned downstream of that insert 500, and thus to prevent a loss of pressure.

In addition, at least some of distances s between adjacent rows of inserts 500 may be different from each other. For example, if a distance between first and second rows of inserts 500 is S1, a distance between second and third rows of inserts 500 is S2, and a distance between third and fourth rows of inserts 500 is S3, the distances S1, S2 and S3 may be different from each other (i.e., S1≠S2≠S3). However, it is understood that the present disclosure is not limited thereto, and all the distances between adjacent rows of inserts 500 may be the same.

Each of the inserts 500 may include a first channel 510 configured to guide the compressed air introduced into an associated one of the impingement holes 320 in a direction substantially parallel to the direction of extension of the annular passage 140 between the flow sleeve 300 and the liner 100, and a second channel 520 configured to guide the compressed air introduced into the impingement hole 320 in a direction transverse to the annular passage 140 between the flow sleeve 300 and the liner 100. The insert 500 may be coupled to the impingement hole 320 by a flange 530 formed integrally with the first and second channels 510 and 520.

Referring to FIGS. 4 and 6, in the insert 500, the first channel 510 is formed in front of the second channel 520 in the direction of flow of compressed air in the annular passage 140. For example, the first channel 510 is bent from the impingement hole 320 toward the front of the liner 100, and the second channel 520 is branched from the first channel 510 to extend toward the surface of the liner 100. In this case, an angle α of the direction of discharge of compressed air from the first channel 510 with respect to the surface of the liner 100 may be −10° to 30°. In addition, the compressed air discharged from the second channel 520 may be directed substantially vertically toward the surface of the liner 100.

Because the compressed air discharged from the first channel 510 is guided in the direction substantially parallel to the direction of flow of compressed air in the annular passage 140, it is possible to reduce the loss of pressure due to the interaction therebetween. At the same time, because the compressed air discharged from the second channel 520 is guided radially toward the outer wall of the liner 100, it is possible to improve the cooling efficiency of the liner 100. Moreover, because a higher mass flow rate may pass through the transition piece 200 due to an increase in pressure drop in the transition piece 200, it is also possible to improve the cooling efficiency of the transition piece 200. As a result of comparing and testing the pressure drop in the liner and transition piece according to the related art and the exemplary embodiment to which the insert 500 is applied, the pressure drop in the transition piece shows 2.482% in the related art, whereas it shows 2.843% in the exemplary embodiment. Therefore, it can be seen that the pressure drop in the transition piece increases in the exemplary embodiment. In addition, the pressure drop in the liner shows 3.202% in the related art, whereas it shows 2.313% in the exemplary embodiment. Therefore, it can be seen that the loss of pressure is reduced by the recovery in total pressure in the exemplary embodiment.

In some exemplary embodiments, in the inserts 500 in adjacent rows, the angles α of the directions of discharge of individual types of compressed air from the respective first channels 510 with respect to the surface of the liner 100 may be different from each other. That is, as illustrated in FIG. 6, if an angle formed by the compressed air discharged from the first channel 510 of each first-row insert with respect to the surface of the liner 100 is α1, an angle formed by the compressed air discharged from the first channel 510 of each second-row insert with respect to the surface of the liner 100 is α2, an angle formed by the compressed air discharged from the first channel 510 of each third-row insert with respect to the surface of the liner 100 is α3, and an angle formed by the compressed air discharged from the first channel 510 of each fourth-row insert with respect to the surface of the liner 100 is α4, the angles α1 and α2 may be different from each other, and/or the angles α2 and α3 may be different from each other, and/or the angles α3 and α4 may also be different from each other. Accordingly, even though all the individual types of compressed air discharged from the respective first channels 510 of the adjacent inserts are guided in the direction substantially parallel to the direction of extension of the annular passage 140, the individual types of compressed air can be mixed well. However, the present disclosure is not limited thereto, and all the angles α1 to α4 may be different from each other (i.e., α1≠α2≠α3≠α4), or all the angles α1 to α4 may be the same.

Referring to FIG. 7, an angle β of a horizontal direction of discharge of compressed air from each of the second channels 520 with respect to a plane of symmetry of an associated first channel 510 may be −30° to 30°. By imparting directionality to the individual types of compressed air discharged from the respective second channels 520, the individual types of compressed air can be mixed well.

Referring to FIG. 8, an angle γ of a vertical direction of discharge of compressed air from each of the second channels 520 with respect to the plane of symmetry of the associated first channel 510 may be −30° to 30°. By imparting directionality to the individual types of compressed air discharged from the respective second channels 520, the individual types of compressed air can be mixed well.

In addition, an outer surface of each insert 500 may have a relatively low air resistance coefficient. The relatively low air resistance coefficient may be approximately 0.4 or less, thereby further reducing the loss of pressure of compressed air.

Hereinafter, a plurality of inserts 2500 according to another exemplary embodiment will be described with reference to FIGS. 9 and 10.

Referring to FIGS. 9 and 10 each, of the inserts 2500 may include a first channel 2510 configured to guide the compressed air introduced into an associated one of the impingement holes 320 in a direction substantially parallel to the direction of extension of the annular passage 140 between the flow sleeve 300 and the liner 100, and a second channel 2520 configured to guide the compressed air introduced into the impingement hole 320 in a direction transverse to the annular passage 140 between the flow sleeve 300 and the liner 100. However, the exemplary embodiment of FIG. 9 differs from the exemplary embodiment of FIG. 4 in that the second channel 2520 includes two second channels 2520.

The first channel 2510 is bent from the impingement hole 320 toward the front of the liner 100, and the two second channels 2520 are each branched from the first channel 2510 to extend toward the surface of the liner 100. In this case, the two second channels 2520 may be formed symmetrically with respect to the plane of symmetry of the first channel 2510. Thus, the individual types of compressed air discharged from the two second channels 2520 may be guided in different directions.

For example, angles γ of the vertical directions of discharge of individual types of compressed air from the respective second channels 2520 with respect to the plane of symmetry of the first channel 2510 may be 0° to 30°. As illustrated in FIG. 10, one of the second channels 2520 is formed at 30° in one direction, and the other of the second channels 2520 is formed at 30° in an opposite direction. As such, by imparting directionality to the individual types of compressed air discharged from the respective second channels 2520, the individual types of compressed air can be mixed well.

Similar to the exemplary embodiment of FIGS. 4 to 6, the angle α of the direction of discharge of compressed air from each first channel 2510 with respect to the surface of the liner 100 may be −10° to 30°. In some exemplary embodiments, in the inserts 2500 in adjacent rows, the angles α of the directions of discharge of individual types of compressed air from the respective first channels 2510 with respect to the surface of the liner 100 may be different from each other.

Accordingly, because the compressed air discharged from each of the first channels 2510 is guided in the direction substantially parallel to the direction of flow of compressed air in the annular passage 140, it is possible to reduce the loss of pressure due to the interaction therebetween. At the same time, because the individual types of compressed air discharged from the two second channels 2520 are guided radially toward the outer wall of the liner 100, it is possible to improve the cooling efficiency of the liner 100. However, the present disclosure is not limited thereto, and three or more second channels 2520 may be formed.

As described above, according to the exemplary embodiments, it is possible to reduce the loss of pressure while enhancing the cooling efficiency of the liner 100 and transition piece 200 as each of the inserts 500 or 2500 includes the first channel 510 or 2510 and one or more second channels 520 or 2520 to guide air axially and radially for cooling the liner 100 and the transition piece 200.

Therefore, the overall efficiency and durability of the gas turbine can be improved.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A combustor comprising:
a liner configured to define a combustion chamber;
a transition piece coupled to a rear end of the liner;
a flow sleeve configured to surround the liner and the transition piece;
a plurality of impingement holes formed in the flow sleeve; and
a plurality of inserts inserted into at least some of the impingement holes to guide combustion air for cooling the liner and the transition piece,
wherein each of the inserts comprises:
a first channel configured to guide combustion air, introduced into an associated one of the impingement holes, in a direction parallel to a direction of extension of an annular passage between the flow sleeve and the liner or an annular passage between the flow sleeve and the transition piece, the first channel being bent from impingement hole toward a front of the liner or the transition piece to discharge combustion air in a direction of combustion air flow in the annular passage; and
a second channel configured to guide the combustion air, introduced into the associated one of the impingement holes, in a direction transverse to the annular passage between the flow sleeve and the liner or the annular passage between the flow sleeve and the transition piece, the second channel extending toward a surface of the liner or the transit a to discharge combustion air in a direction perpendicular to the surface of the liner or the transition.

2. The combustor according to claim 1, wherein the first channel is formed in front of the second channel in a direction of flow of combustion air in the annular passage.

3. The combustor according to claim 2, wherein the insert has a low air resistance coefficient.

4. The combustor according to claim 2, wherein the inserts are arranged in a plurality of rows in an axial direction of the flow sleeve, and the inserts in adjacent rows are staggered.

5. The combustor according to claim 4, wherein at least some of distances between the adjacent rows are different from each other.

6. The combustor according to claim 4, wherein the second channel is branched from the first channel to extend toward a surface of the liner or transition piece.

7. The combustor according to claim 4, wherein the second channel comprises two or more second channels.

8. The combustor according to claim 7, wherein the two or more second channels are formed symmetrically with respect to a plane of symmetry of the first channel.

9. The combustor according to claim 4, wherein an angle (α) of a direction of discharge of combustion air from each of the first channels with respect to a surface of the liner or transition piece is in a range of −10 to 30 degrees.

10. The combustor according to claim 9, wherein in the inserts in adjacent rows, angles (α) of directions of discharge of individual types of combustion air from the respective first channels with respect to the surface of the liner or transition piece are different from each other.

11. The combustor according to claim 4, wherein an angle (β) of a horizontal direction of discharge of combustion air from each of the second channels with respect to a plane of symmetry of an associated first channel is in a range of −30 to 30 degrees.

12. The combustor according to claim 4, wherein an angle (γ) of a vertical direction of discharge of combustion air from each of the second channels with respect to a plane of symmetry of an associated first channel is in a range of −30 to 30 degrees.

13. A gas turbine comprising:
a compressor configured to compress air;

a combustor configured to mix fuel with the air compressed by the compressor and combust a mixture of fuel with the compressed air to produce high-temperature and high-pressure combustion gas; and a turbine configured to generate power using the combustion gas produced by the combustor, wherein the combustor comprises:

a liner configured to define a combustion chamber;

a transition piece coupled to a rear end of the liner;

a flow sleeve configured to surround the liner and the transition piece;

a plurality of impingement holes formed in the flow sleeve; and a plurality of inserts inserted into at least some of the impingement holes to guide combustion air for cooling the liner and the transition piece, and wherein each of the inserts comprises:

a first channel configured to guide compressed au, introduced into an associated one of the impingement holes, in a direction parallel to a direction of extension of an annular passage between the flow sleeve and the liner or an annular passage between the flow sleeve and the transition piece, the first channel being bent from the impingement hole toward a front of the liner or the transition piece to discharge combustion air in a direction of combustion air flow in the annular passage; and a second channel configured to guide the compressed air, introduced into the associated one of the impingement holes, in a direction transverse to the annular passage between the flow sleeve and the liner or the annular passage between the flow sleeve and the transition piece, the second channel extending toward a surface of the liner or the transition to discharge combustion air in a direction perpendicular to the surface of the liner or the transition.

14. The gas turbine according to claim 13, wherein the first channel is formed in front of the second channel in a direction of flow of compressed air in the annular passage.

15. The gas turbine according to claim 14, wherein the inserts are arranged in a plurality of rows in an axial direction of the flow sleeve, and the inserts in adjacent rows are staggered.

16. The gas turbine according to claim 15, wherein the second channel is branched from the first channel to extend toward a surface of the liner or transition piece.

17. The gas turbine according to claim 15, wherein:

the second channel comprises two or more second channels; and the two or more second channels are formed symmetrically with respect to a plane of symmetry of the first channel.

18. The gas turbine according to claim 15, wherein an angle ($\alpha$) of a direction of discharge of compressed air from each of the first channels with respect to a surface of the liner or transition piece is in a range of −10 to 30 degrees.

19. The gas turbine according to claim 15, wherein an angle ($\beta$) of a horizontal direction of discharge of compressed air from each of the second channels with respect to a plane of symmetry of the associated first channel is in a range of −30 to 30 degrees.

20. The gas turbine according to claim 15, wherein an angle ($\gamma$) of a vertical direction of discharge of compressed air from each of the second channels with respect to a plane of symmetry of the associated first channel is in a range of −30 to 30 degrees.

* * * * *